US012661858B2

(12) United States Patent
Leblay et al.

(10) Patent No.: US 12,661,858 B2
(45) Date of Patent: Jun. 23, 2026

(54) FLEXIBLE MOLD SEGMENT WITH SIPE ELEMENT HAVING A PROJECTION FOR USE IN FORMING A TIRE

(71) Applicant: COMPAGNIE GENERALE DES ETABLISSEMENTS MICHELIN, Clermont-Ferrand (FR)

(72) Inventors: Damien Leblay, Clermont-Ferrand (FR); Jaroslaw Michno, Olsztyn (PL); Dariusz Konobrocki, Olsztyn (PL)

(73) Assignee: Compagnie General des Etablissements Michelin, Clermont-Ferrand (FR)

( * ) Notice: Subject to any disclaimer, the term of this patent is extended or adjusted under 35 U.S.C. 154(b) by 301 days.

(21) Appl. No.: 18/259,506

(22) PCT Filed: Dec. 29, 2020

(86) PCT No.: PCT/IB2020/062523
§ 371 (c)(1),
(2) Date: Jun. 27, 2023

(87) PCT Pub. No.: WO2022/144572
PCT Pub. Date: Jul. 7, 2022

(65) Prior Publication Data
US 2024/0059037 A1 Feb. 22, 2024

(51) Int. Cl.
B29D 30/06 (2006.01)

(52) U.S. Cl.
CPC .. B29D 30/0606 (2013.01); B29D 2030/0613 (2013.01); B29K 2881/04 (2013.01)

(58) Field of Classification Search
CPC ............................................. B29D 2030/0613
See application file for complete search history.

(56) References Cited

U.S. PATENT DOCUMENTS

2007/0187117 A1* 8/2007 Tanaka ................... B29C 64/153
172/1
2011/0309556 A1 12/2011 Lauwers
(Continued)

FOREIGN PATENT DOCUMENTS

CN 104044230 A 9/2014
DE 19749565 C1 3/1999
(Continued)

OTHER PUBLICATIONS

Kwang-won. KR-20120002114-U. 2012. Machine Translation via ESpaceNet. Accessed Jun. 18, 2025 (Year: 2012).*
(Continued)

*Primary Examiner* — Sedef E Paquette
*Assistant Examiner* — Alexander D Booth
(74) *Attorney, Agent, or Firm* — Neal P. Pierotti

(57) ABSTRACT

A mold segment for forming a tire is provided that has a sipe element with first and second ends. A first side face is oppositely disposed from a second side face in a width direction, and a bottom is oppositely disposed from a top in a height direction. The sipe element has a projection that extends from the first side face. A mold segment base made of a material that is more flexible than material making up the sipe element is present. The mold segment base receives the sipe element such that the bottom of the sipe element is located inside of the mold segment base and the top of the sipe element is located outside of the mold segment base. The mold segment base defines a cavity, and the projection is located inside of the cavity.

13 Claims, 10 Drawing Sheets

(56) References Cited

U.S. PATENT DOCUMENTS

| | | | |
|---|---|---|---|
| 2013/0164401 A1* | 6/2013 | Dusseaux | B22F 5/007 |
| | | | 425/28.1 |
| 2014/0020859 A1 | 1/2014 | Enokido | |
| 2021/0016530 A1 | 1/2021 | Novotny et al. | |

FOREIGN PATENT DOCUMENTS

| | | | | |
|---|---|---|---|---|
| EP | 1652644 A1 | | 5/2006 | |
| JP | H01134061 A | | 5/1989 | |
| JP | 2002096200 A | | 4/2002 | |
| JP | 2003211454 A | | 7/2003 | |
| JP | 2006231747 A | | 9/2006 | |
| JP | 2009262352 A | * | 11/2009 | |
| KR | 20120002114 U | * | 3/2012 | B29D 30/02 |
| WO | 2020128798 A1 | | 6/2020 | |

OTHER PUBLICATIONS

Ishihara. JP2003211454A. 2003. Machine Translation via ESpaceNet. Accessed Jun. 18, 2025 (Year: 2003).*
Shirato. JP2009262352A. 2009. Machine Translation via ESpaceNet. Accessed Oct. 29, 2025. (Year: 2025).*
European Patent Office, International Search Report dated Sep. 14, 2021, pp. 1-12 (included), European Patent Office, Rijswijk, The Netherlands.

* cited by examiner

FLEXIBLE MOLD SEGMENT WITH SIPE ELEMENT HAVING A PROJECTION FOR USE IN FORMING A TIRE

CROSS-REFERENCE TO RELATED APPLICATIONS

The present application is a 35 U.S.C. § 371 application of PCT/IB2020/062523 filed on Dec. 29, 2020 and entitled "Flexible Mold Segment with Sipe Element Having a Projection for use in Forming a Tire" and claims benefit thereto. The entire contents of PCT/IB2020/062523 are incorporated by reference herein in their entirety for all purposes.

FIELD OF THE INVENTION

The present invention relates generally to a flexible mold segment for the formation of tires. More particularly, the present application involves a flexible mold segment that features a sipe element with a projection for insertion into a counterpart cavity of the flexible mold segment.

BACKGROUND

The production of tires includes the step of placing an uncured tire within a mold at which time heat and pressure is applied to the uncured tire in order to change its state to a cured condition. During the curing process, the uncured tire is placed inside of a metal mold that surrounds the exterior of the uncured tire. An expandable rubber bladder is positioned inside of the uncured tire, when it is within the mold, and is expanded to apply pressure to the inside surface of the uncured tire. The pressure applied by the expandable bladder forces the uncured tire against the mold to cause the uncured tire to be under pressure forces. Heat is simultaneously applied, and the combination of heat and pressure applied for a particular time effects the curing process. The cured tire is then removed from the mold and transported downstream for subsequent processing.

The expandable bladder when inflated and applying force causes the crown portion of the tire to be forced against a garniture of the mold that includes a series of features that form grooves, sipes, and tread blocks of the tire to result in the formation of the tread design of the tire. The garniture can be made of two or more multiple sections that are arranged in a circle, and these production mold segments are used to form the architecture of the tread. In order to form sipes of the tread, a series of sipe sections are present in the production mold segment. Additional sipe elements may be included to form sipes that could be V-shaped, Y-shaped, or alternatively shaped and that can extend in the longitudinal direction, lateral direction, or both in the longitudinal and lateral directions.

In order to form the production mold segment, the casting process employs a gypsum/plaster cast segment that includes the sipe elements. In order to form the gypsum cast segment, a flexible cast segment is used and into this flexible cast segment the sipe elements that are eventually transferred to the production mold segments are inserted. The flexible cast segment may be known as a flexible mold segment or as simply a mold segment. The sipe elements may be made of steel or other metal while the flexible cast segment base is made of rubber or some other more flexible material. In order to form the flexible cast segment, a master/positive segment is formed that can have preliminary sipe forming elements in it the negative of which are transferred to the flexible cast segment. In the flexible cast segment, the sipe elements may need to be forced into the flexible base of the flexible cast segment and doing so can result in difficulty in precisely aligning the sipe elements with other features of the flexible base. Due to the flexibility of the flexible base, the positioning of the sipe elements may change during the subsequent stages of the development of the production mold.

In order to maintain the positioning of the sipe elements within the flexible mold, it is known to incorporate locking features between the sipe elements that cause one of the sipe elements to be constrained with respect to another touching sipe element. This connection between the two steel sipe elements occurs at either the ends of both of the sipe elements, or in other versions occurs between the end of one and a face of the second sipe element. Although the connection of multiple sipe elements fixes their position with respect to one another to some extent, this connection does not constrain the positioning of the sipe elements to the flexible base itself and they are still able to be moved out of position therewith. As such, there remains room for variation and improvement within the art.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended FIGS. in which.

Figure 1:
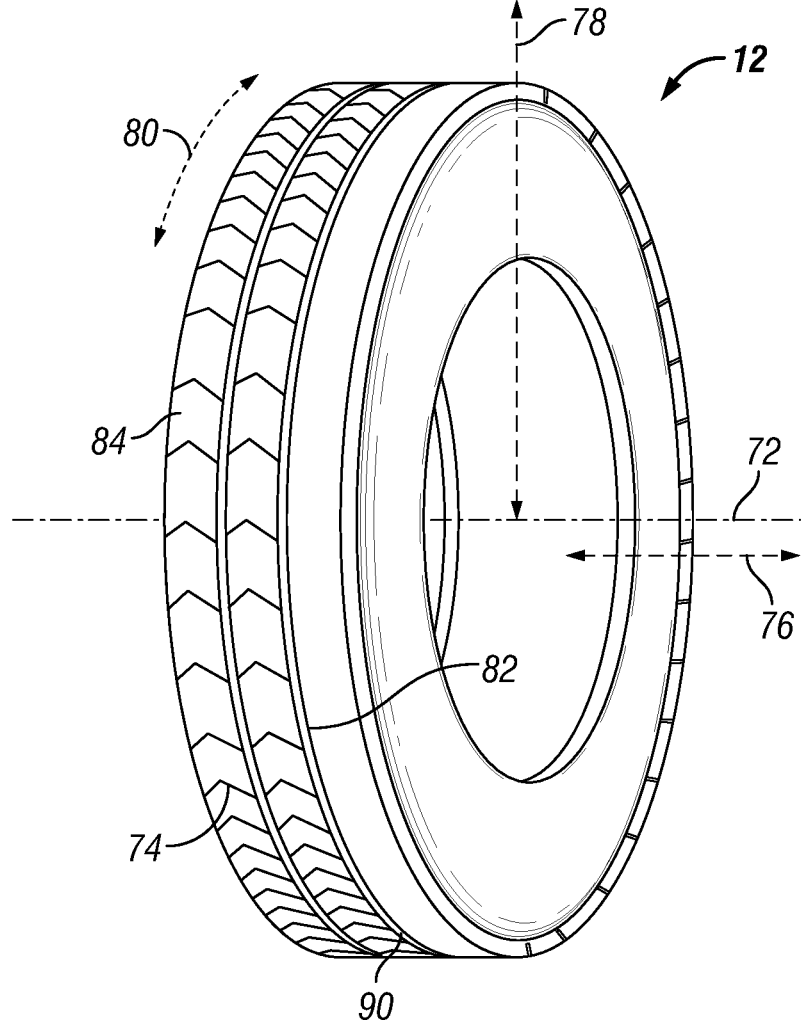
FIG. 1 is a perspective view of a tire with a sipe immediately adjacent a groove.

Repeat use of reference characters in the present specification and drawings is intended to represent the same or analogous features or elements of the invention.

DETAILED DESCRIPTION OF REPRESENTATIVE EMBODIMENTS

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

A mold segment 10 is provided that has a sipe element 14 that includes first and second side faces 20, 22 with a projection 30 on the first side face 20. The mold segment 10 is a flexible mold segment 10 that is used in forming a production mold segment 68 that ultimately molds a green tire into a cured tire 12. The mold segment 10 also includes a mold segment base 32 that is made of a material, such as polysulfide castable mold rubber, that is more flexible than the sipe element 14. The mold segment base 32 includes a cavity 34 that is within the mold segment base 32 and is big enough to receive the projection 30. The sipe element 14 is pushed into the softer material of the mold segment base 32 in a desired position and upon doing so the projection 30 is received within the cavity 34. This receipt enhances the stability and positioning of the sipe element 14 within the mold segment base 32 to eventually result in a more known and accurate positioning of the sipe 74, 82 formed by the sipe element 14 when the tire 12 is cured. The cavity 34 is sized and shaped in such a way that it provides some holding force to the projection 30 upon receipt of the projection 30 within the cavity 34.

With reference to FIG. 1, a tire 12 is illustrated in perspective view that has a central axis 72 that serves as the axis of rotation of the tire 12. The central axis 72 extends through the center of the tire 12 and is aligned in the axial direction 76. The radial direction 78 of the tire 12 extends outward from the central axis 72 and is perpendicular to the central axis 72. The tire 12 also has a circumferential direction 80 that extends around the circumference of the tire 12 and circles the central axis 72. The circumferential direction 80 may be located at any distance from the central axis 72 in the radial direction 78 of the tire 12 and need not be located only at the tread 84 or the outer most portion of the tire 12 in the radial direction 78.

The tire 12 has tread 84 that features various tire architecture such as tread blocks, grooves, sipes, and ribs. Other tire 12 architecture of the tread 84 shown includes V-shaped sipes 74 that are located in two of the three sections formed by the shoulder edges of the tread 84 and two grooves 90 that extend completely around the tire 12 in the circumferential direction 80. A circumferential sipe 82 extends completely around the tire 12 in the circumferential direction 80 and is immediately adjacent the circumferential groove 90 and spaced slightly therefrom. This spacing may be 1, 2, 3, 4 or from 5-10 millimeters in certain embodiments in the axial direction 76 and can be consistent along their entire lengths or may vary at different locations along the lengths of the circumferential sipe 82 and circumferential groove 90 in the circumferential direction 80. Sipes 74, 82 are defined as grooves of the tread 84 that have a width at the tread surface that is 2 millimeters or less. The grooves of the tread 84 may thus be grooves that have widths that are greater than 2 millimeters. The widths of the sipes 74, 82 can be measured at the surface of the tread 84 when the tread 84 is new and not worn, as in some instances the teardrop sections of the sipes 74, 82, if they have them, may in fact be larger than 2 millimeters. The sipes 74, 82 and grooves 90 can take on any shape and extend in any direction such as angled, curved, or zig-zag. The sipes 74 are V-shaped in that they have two legs arranged at an angle to one another, and an apex is at the point where the two legs intersect. A pair of sidewalls extend from the crown of the tire 12 on either side in the axial direction 76 towards the center in the radial direction 78. Depending upon the tire 12 geometry, some features of the tread 84, such as lateral sipes 74 and grooves, may extend into the sidewalls as well.

Figure 2:
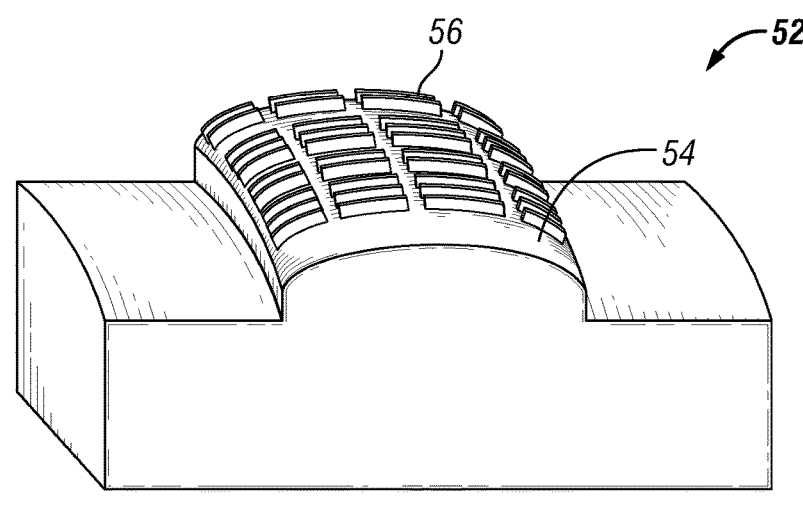
FIG. 2 is a perspective view of a master mold base.

In order to cure the tire 12, the uncured tire 12 is placed into a mold 92 having production mold segments 68. In order to build the projection mold segments 68, a number of initial and intermediate mold segments need to be first produced. First, the initial design for the tire 12 could be made by a designer in a computer program, and this design could be transferred to a master mold 52 via a CNC machining operation. The master mold 52 is shown in FIG. 2 and includes a master mold base 54 that is milled from a block of material and is a positive image of the tire 12 to be produced. As a milled component, the master mold base 54 is made out of a hard, non-flexible material but is not so hard that it cannot be cut and shaped in a milling process. In order to form smaller features in the tire 12, such as the sipes 74, 82, preliminary sipes 56 are set into the master mold base 54. The preliminary sipes 56 are made of metal and can be placed by hand into cavities of the master mold base 54 by a user. The preliminary sipes 56 are placed into the areas in which sipes 74, 82 are eventually desired to be located at in the tire 12. Due to the rigidity of the master mold base 54, the locations the preliminary sipes 56 are inserted into are fixed and at known positions without a high degree of variation.

Figure 3:
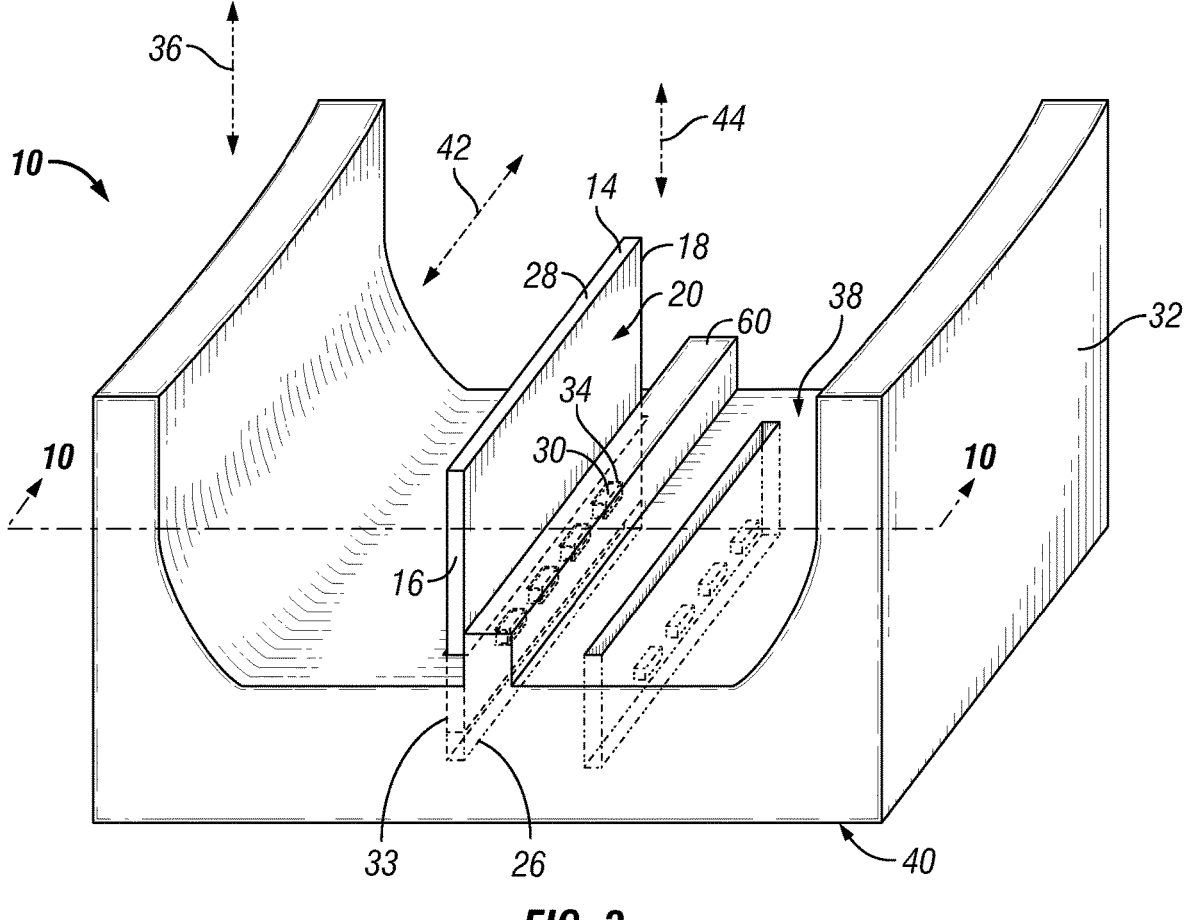
FIG. 3 is a perspective view of a flexible mold segment.

After completion of the master mold 52, the next step in the production process is the formation of a flexible mold segment 10, one example of which is shown with reference to FIG. 3. Here, polysulfide castable mold rubber can be poured over the master mold 52 and allowed to harden. It is to be understood that this material is but one material and that others are possible in forming the flexible mold segment 10. Once sufficiently hardened, the user may peel the polysulfide castable mold rubber off of the master mold 52 to reveal a negative of the tire 12 in the flexible mold segment 10. The preliminary sipes 56 are not transferred into the flexible mold segment 10 but instead remain within the master mold 52, but preliminary sipes 56 do form complimentary voids in the flexible mold segment 10 at locations where sipes 74, 82 are desired. The flexible mold segment 10 has a mold segment base 32 that is made of the polysulfide castable mold rubber and shows the negative of the tread 84. Sipe elements 14 are provided that are made of steel or aluminum or other material harder than that of the material making up the mold segment base 32. The user will then take these various sipe elements 14, one of which is shown in FIG. 3, and push them into the softer material of the mold segment base 32. The mold segment base 32 will have voids into which the sipe elements 14 are located, but the size of the sipe elements 14 can be somewhat larger than these voids so that the sipe elements 14 are forced into the softer material of the mold segment base 32 and held therein as the material will push back and act to retain the sipe elements 14. However, this type of placement may result in movement of the sipe elements 14 away from their desired location, or subsequent steps in the mold formation process may cause these sipe elements 14 to move or change orientation to degrade quality of the desired tire 14 that is eventually molded.

Figure 4:
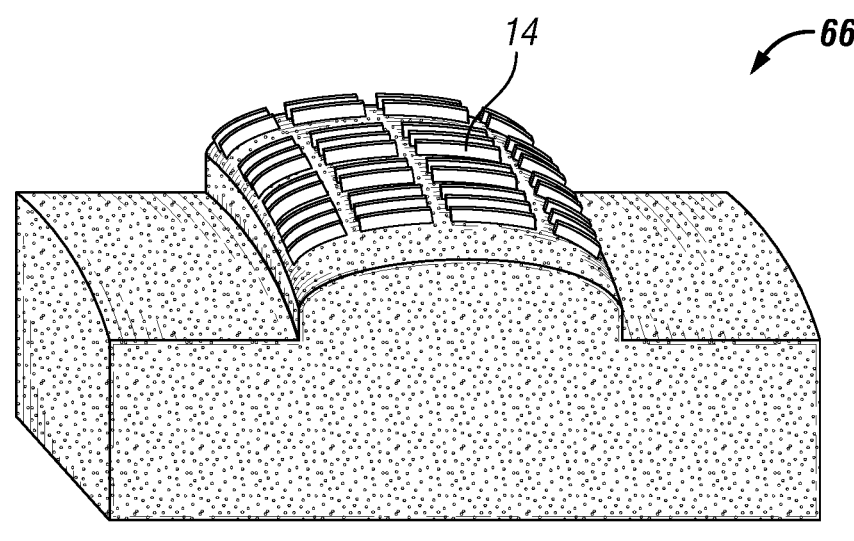
FIG. 4 is a perspective view of a gypsum plaster cast segment.

The flexible mold segment 10 is used to make a gypsum plaster cast segment 66 as shown for example in FIG. 4. Gypsum plaster may be poured onto the flexible mold segment 10, or the flexible mold segment could otherwise come into contact with the plaster. Once the plaster sets and hardens, the gypsum plaster cast segment 66 forms a positive image of the tire 12 that is being produced. The user can then peel the flexible mold segment 10 off of the gypsum plaster cast segment 66 to reveal the mold segment as shown in FIG. 4. The sipe elements 14 are embedded and held within the gypsum plaster cast segment 66, and peeling of the mold segment base 32 causes the mold segment base 32 to become detached from the various sipe elements 14 thus causing the sipe elements 14 to be transferred from the flexible mold segment 10 to the gypsum plaster cast segment 66. The gypsum plaster cast segment 66 has various features that are imparted into the production mold segment 68 such as grooves, ribs, and shoulder features. To form the production mold segment 68, hot liquid aluminum is poured onto the gypsum plaster cast segment 66 which then hardens and takes on the features of the gypsum plaster cast segment 66, and the exposed pieces such as the sipe elements 14 are embedded into the production mold segment 68. The hot liquid aluminum thus forms a production mold segment base 70 into which the sipe elements 14 are mounted. The gypsum plaster is chipped or machined away in order to remove it from the production mold segment 68 while leaving the sipe elements 14 within the production mold segment 68. In this regard, the sipe elements 14 are transferred from the gypsum plaster cast segment 66 to the production mold segment base 70 of the production mold segment 68.

Figure 5:
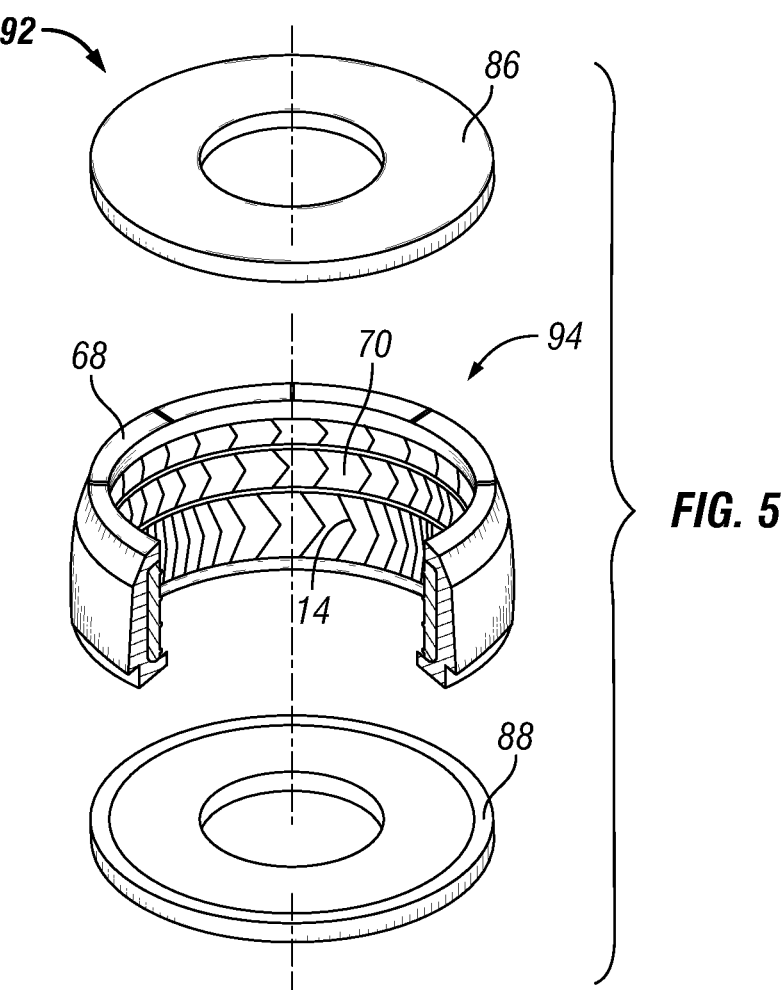
FIG. 5 is an exploded perspective view of a mold.

The FIG. 5 shows a mold 92 for curing a tire 12. A tire 12 that is made of uncured rubber is placed into the mold 92 and cured via heat and pressure applied by the mold 92. The mold 92 can be configured in a variety of ways. In the embodiment illustrated, the mold 92 includes a garniture 94 that has a series of production mold segments 68 that engage the tire 12 to form the tread 84 of the tire 12. The mold 92 also includes a top mold section 86 and a bottom mold section 88 that engage the sidewalls of the tire 12 and form the sidewall portions. In other arrangements, additional top and bottom mold sections 86, 88 can be included and thus multiple other components may be present in the mold 92 for forming the tire 12. The green/unmolded tire 12 can be placed inside of the garniture 94 and the top and bottom mold sections 86, 88 may be moved into engagement with the garniture 94. An inflatable bladder is placed through one of the sections 86, 88 and inside of the tire 12 and is inflated in order to press the tire 12 against the tread producing elements of the production mold segments 68, which for example may be the sipe elements 14 that form the sipes 74 and 82, and against the insides of the top and bottom mold sections 86, 88. Heating elements can be located within the various production mold segments 68 or they may be otherwise heated in order to transfer heat into the tire 12 that is within in the mold 92. In this manner, the mold 92 is capable of applying heat and pressure to the tire 12 that is within the mold 92. Although described as all being moveable, it may be the case that some of the production mold segments 68 are not movable while others are in fact movable to open and close the mold 92. The production mold segments 68 may be movable in that they move relative to the ground onto which the mold 92 rests.

The bladder can be inflated with air, steam, liquid, nitrogen, or any other fluid to cause it to expand to force the tire 12 against the tread and sidewall forming portions of the mold 92. After sufficient heat and pressure are applied to the tire 12 for a sufficient amount of time, the bladder can be deflated and the top and/or bottom mold sections 86, 88 can be moved away from the garniture 94 to allow the cured tire 12 to be removed for subsequent processing.

Figures 6, 7, 8:
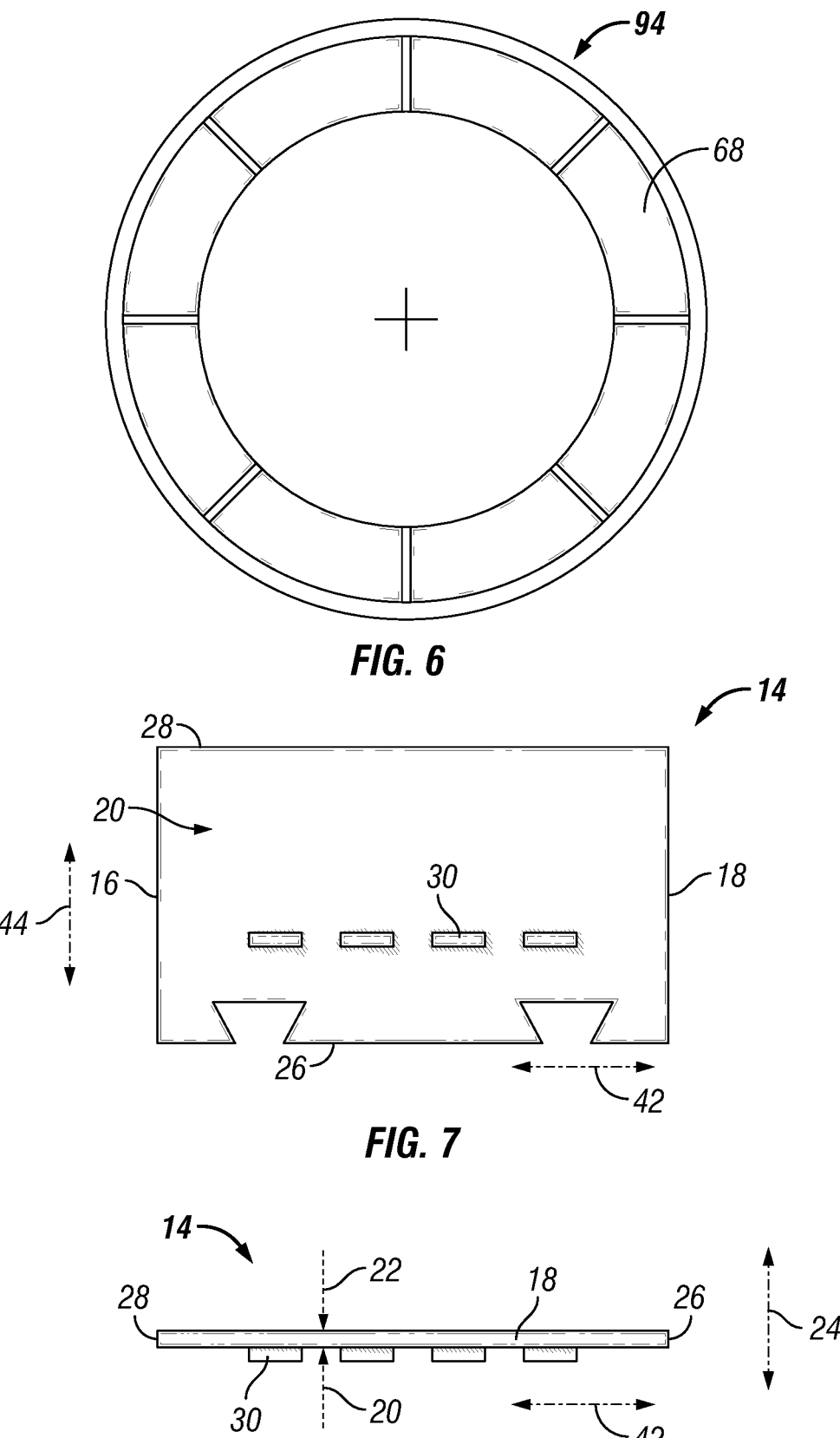
FIG. 6 is a top view of a garniture.
FIG. 7 is a side view of a sipe element with projections longer than they are taller.
FIG. 8 is a top view of the sipe element of FIG. 7.

With reference to FIG. 6, the garniture 94 of the mold 92 is made of a plurality of production mold segments 68 that extend 360 degrees about an axis. The production mold segments 68 may be in engagement with one another, or a small space could be present between the production mold segments 68. In some arrangements, the production mold segments 68 can move in the radial direction towards the central axis to further add pressure to the tire 12 during curing. In other instances, the production mold segments 68 are stationary and do not move in the radial direction. The production mold segments 68 can be the same size as one another or may be different sizes from one another. Although 8 production mold segments 68 are shown, it is to be understood that the garniture 94 can include any number of production mold segments 68 in other arrangements. For example, from 9-12 production mold segments 68 can be included in the garniture 94 in other versions of the mold 92. The production mold segments 68 thus engage the tire 12 during formation and include the various sipe elements 14 that are used to form sipes 74, 82 of the tire 12 upon molding by the mold 92.

The present invention relates primarily to the flexible mold segment 10 that is a stage of the production process in making the production mold 92 that actually molds the tire 12. The flexible mold segment 10 therefore is not a production mold 92, and the mold segment base 32 is not a production mold segment base 70 and thus does not engage the tire 12 at any point. As stated, the flexible mold segment 10 includes a series of sipe elements 14 that are eventually transferred to the production mold 92 and thus become part of the production mold 92. One example of a sipe element 14 is shown with reference to FIGS. 7 and 8 which are a side view and a top view respectively. The sipe element 14 has a first end 16 and an oppositely disposed second end 18 that are spaced from one another in a length direction 42 of the sipe element 14. The ends 16, 18 may be terminal ends of the sipe element 14 such that these portions of the sipe element 14 are at the extreme two ends in the length direction 42. The ends 16, 18 are shown as being parallel to one another but need not be parallel in other arrangements. The length of the sipe element 14 in the length direction 42 is the longest extent of the sipe element 14. The sipe element 14 has a bottom 26 and an oppositely disposed top 28 in a height direction 44 of the sipe element 14. The height direction 44 is perpendicular to the length direction 42, and the height of the sipe element 14 can be the distance from the bottom 26 to the top 28, and the height of the sipe element 14 is less distance than the length of the sipe element 14 in the length direction 42. The bottom 26 is the portion of the sipe element 14 that is inserted into the mold segment base 32 and covered by it while the top 28 is exposed. The bottom 26 is shown as having a pair of triangular shaped recesses that have lips that facilitate gripping the rubber of the mold segment base 32 when pushed therein. A width direction 24 of the sipe element 14 is perpendicular to both the length and height directions 42, 44, and the sipe element 14 is shorter in the width direction 24 than it is in either the length direction 42 or the height direction 44. The sipe element 14 has a first side face 20 and an oppositely disposed second side face 22, and the side faces 20, 22 are separated from one another in the width direction 24. The side faces 20, 22 are planar faces as shown, but need not be planar in other embodiments as they may be angled, wavy, curved or variously shaped.

The sipe element 14 also includes a series of projections 30 that extend from the first side face 20 in the width direction 24. The projections 30 may extend for a longer length in the width direction 24 than the distances between the side faces 20, 22 in the width direction 24. The projections 30 are all the same as one another with respect to their shape and size and are spaced the same amount from successive projections 30. The projections 30 extend a longer distance in the length direction 42 than they extend in the height direction 44. Although the projections 30 can be located anywhere along the height of the first side face 20 in the height direction 44, they are located as some point along the bottom half of the first side face 20 in the height direction 44 so that they are closer to the bottom 26 than to the top 28 in the height direction 44. The projections 30 may be made of the same material as the rest of the sipe element 14 and can be integrally formed with the rest of the sipe element 14 in some embodiments but not in others. The sipe element 14 may be formed through casting, additive manufacturing, or vie any other process. Additive manufacturing allows the projection 30 to be formed on the first side face 20 of the sipe element 14. The additive manufacturing process may have limitations regarding the amount of undercutting available in the projection 30 and sipe element 14 formation. A laser trimming process could also be employed to form the sipe element 14 with the projection 30.

Figure 9:
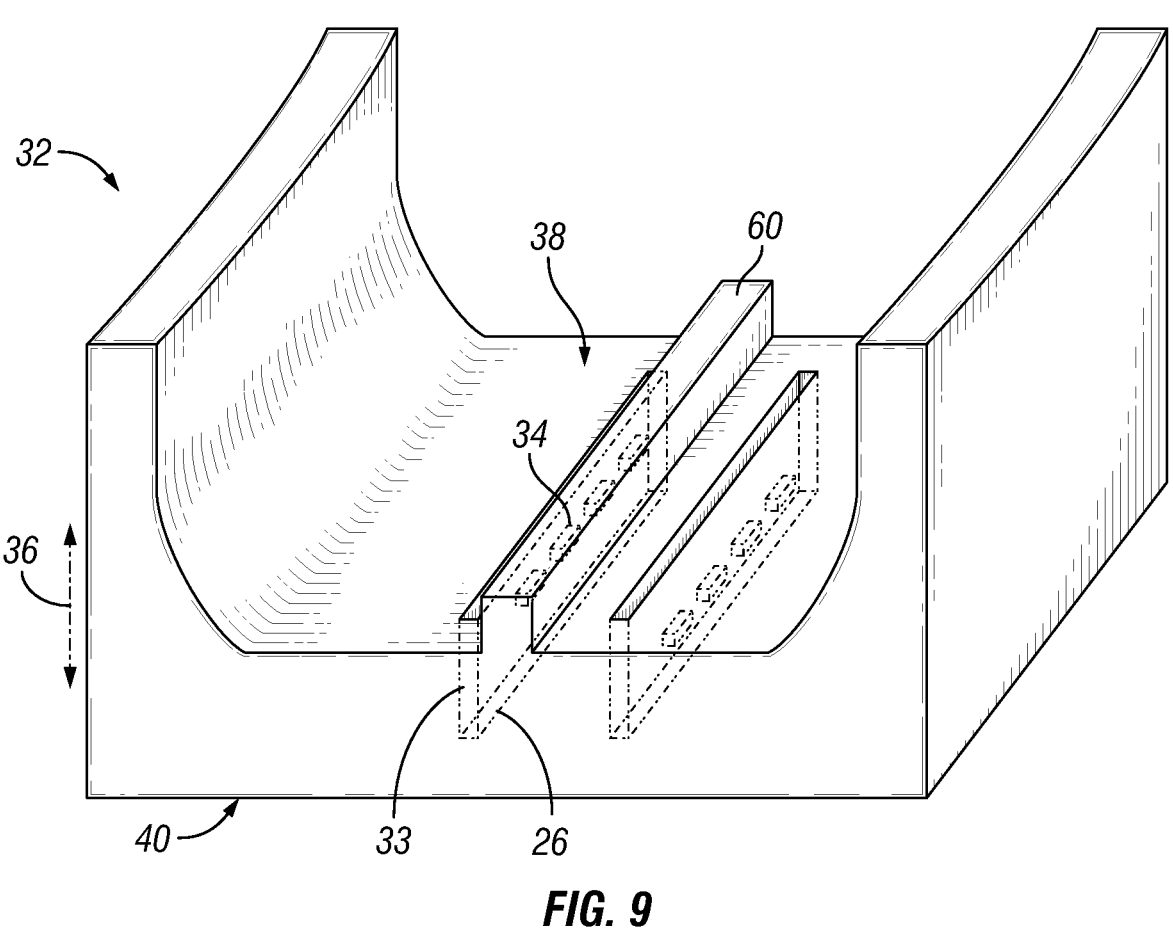
FIG. 9 is a perspective view of a mold segment base.

FIG. 9 is a perspective view of a mold segment base 32 of the flexible mold segment 10 as previously discussed that can be made out of polysulfide castable mold rubber in accordance with various exemplary embodiments. The mold segment base 32 has an upper surface 38 and an oppositely disposed lower surface 40 in a mold segment base height direction 36. The mold segment base 32 is a negative image of the tire 12 and has features of the upper surface 38 that are negatives of elements of the tire 12. For example, a bead 60 is present on the upper surface 38 and will be used in subsequent steps to form a groove 90 of the tread 84. The mold segment base 32 includes a series of cavities 34 that are located within the mold segment base 32 so that they are spaced from both the upper surface 38 and the lower surface 40 in the mold segment base height direction 36. The cavities 34 have a shape that is complimentary to that of the projections 30 and in some instances may have the exact same shape as that of the projections 30. The cavities 34 can have a size that is the same as that of the projections 30. In other embodiments, the cavities 34 are sized to be smaller or larger than the projections 30. The cavities 34 are spaced from one another the same amount as the projections 30 so that they can receive respective projections 30 therein. A recess 33 is present and is a void in the mold segment base 32. The recess 33 can be open at the upper surface 38 and may be in communication with all of the cavities 34 that receive the projections 30 of a particular sipe element 14. The recess 33 may be present in order to aid in the formation of the cavities 34 within the mold segment base 32. The recess 33 may also be present in order to aid the user in determining where the sipe element 14 should be inserted within the mold segment base 32. It is to be understood that in other embodiments the recess 33 need not be present, and the cavities 34 can be hidden from view upon the user initially receiving the mold segment base 32.

Figure 10:
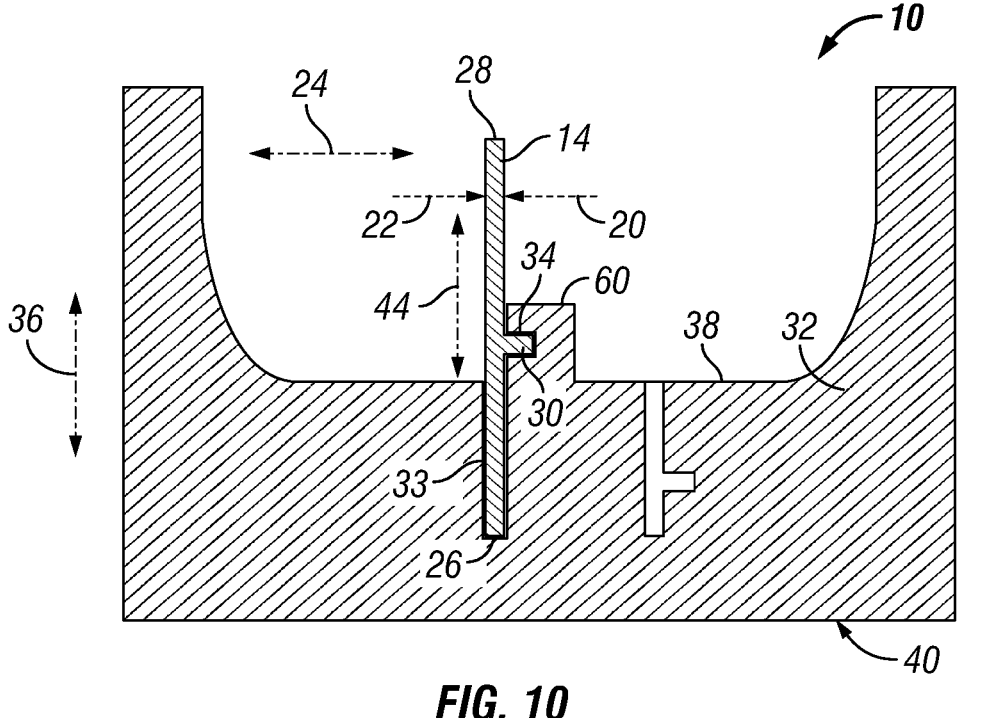
FIG. 10 is a cross-sectional view taken along line 10-10 of FIG. 3.

To assemble the flexible mold segment 10, the user will take the sipe element 14 and push it into the mold segment base 32, and this assembly is shown with reference to FIG. 3 and FIG. 10 which is a cross-sectional view taken along line 10-10 of FIG. 3. The user can insert the sipe element 14 into the recess 33 so the bottom 26 is pushed inside of the mold segment base 32. The depth of the recess 33 in the mold segment base height direction 36 may be shorter than what is desired of the sipe element 14 to be inserted into the flexible mold segment 10. In these instances, the sipe element 14 can be forced into the softer material of the mold segment base 32 and the bottom 26 pushed lower in the mold segment base height direction 36 than the lowest point of the recess 33. The gripping forces of the mold segment base 32 may retain the sipe element 14 therein. The flexible mold segment 10 includes the projections 30 that upon insertion of the sipe element 14 are located within the cavities 34. Some of the cavities 34 as shown are within the bead 60 of the mold segment base 32. This interaction functions to further retain the sipe element 14 within the mold segment base 32 and to maintain the position of the sipe element 14 in the desired spot without shifting during formation process. The material of the mold segment base 32 may be immediately above and below the projection 30 in the mold segment base height direction 36 and if the top and bottom of the projection 30 is engaged by this material it may function to squeeze the projection 30 and hold it and the rest of the sipe element 14 in place. The depth of the cavity in the width direction 24 could be the same as the extension of the projection 30 in the width direction 24 or it may be longer. Even if the cavity 34 is greater in size than the projection 30, placement therein will still function to hold the sipe element 14 in place as movement of the projection 30 will cause it to hit the material of the mold segment base 32 defining the cavity 34 and stop further movement.

Placement of the sipe element 14 into the mold segment base 32 may cause the recess 33 to open up when the projection 30 is within the recess 33 and is larger than the recess 33. The flexibility of the material making up the mold segment base 32 allows for this deformation. Once the projection 30 is aligned with the cavity 34 the material will spring back into place to relieve this deformation of the recess 33. Although shown as having the same shape as the projection 30, the cavity 34 may have a different shape from the projection 30 in other embodiments. The cavity 34 is rectangular as shown but can be variously shaped in other embodiments. Placement of the projection 30 within the cavity 34 causes the sipe element 14 to be interlocked with the mold segment base 32. It is to be understood that the projections 30 and the sipe elements 14 can be variously shaped in accordance with different exemplary embodiments and need not have rectangular and planar shapes in other versions of the flexible mold segment 10.

Figure 11:
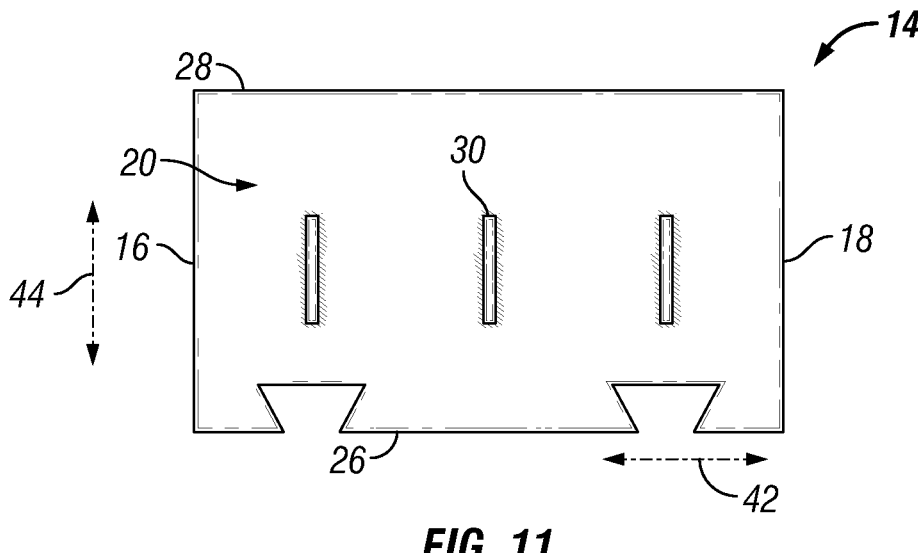
FIG. 11 is a side view of a sipe element with projections taller than they are longer.
Figure 12:
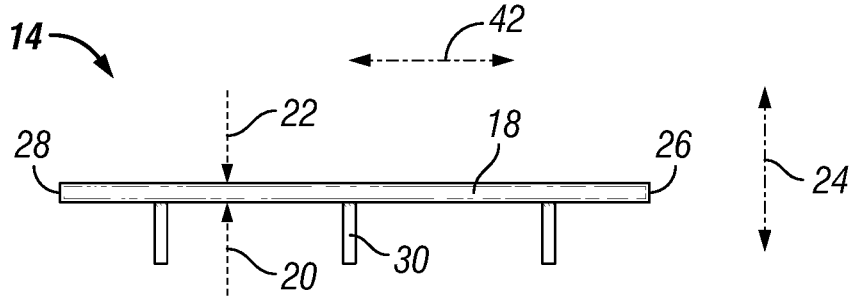
FIG. 12 is a top view of the sipe element of FIG. 11.

FIGS. 11 and 12 show an alternate embodiment of the sipe element 14 in that the projections 30 are different from the FIGS. 7 and 8 embodiment. Here, the projections 30 have a longer length in the height direction 44 than they do in the length direction 42. The extension of the projections 30 in the width direction 24 are longer than the length between the first and second side faces 20, 22 in the width direction 24. Although all of the projections 30 are of the same size and shape, this need not be the case in other embodiments in which different ones of the projections 30 have different sizes and shapes than other ones of the projections 30 of the sipe element 14. Further, although shown as appearing on only the first side face 20 and not the second side face 22, in other embodiments one or more of the projections 30 can be present on the first side 20 while one or more of the projections 30 are on the second side face 22. As such, various configurations of the projections 30 on the sipe element 14 exist. The cavities 34 are configured in an appropriate manner in the mold segment base 32 based upon the establishment of the projections 30 on the sipe element 14.

Figure 13:
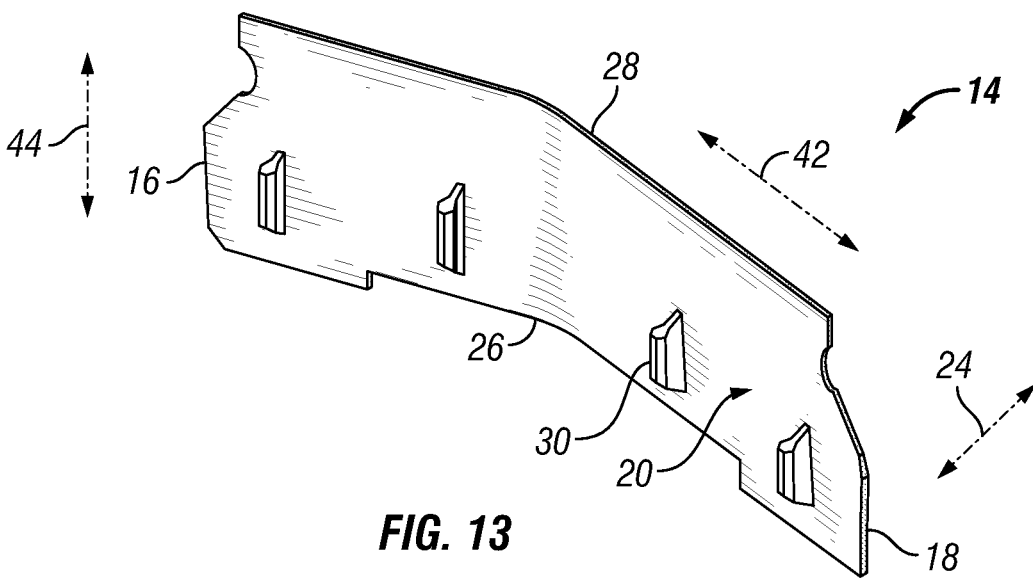
FIG. 13 is a perspective view of a sipe element.
Figure 14:
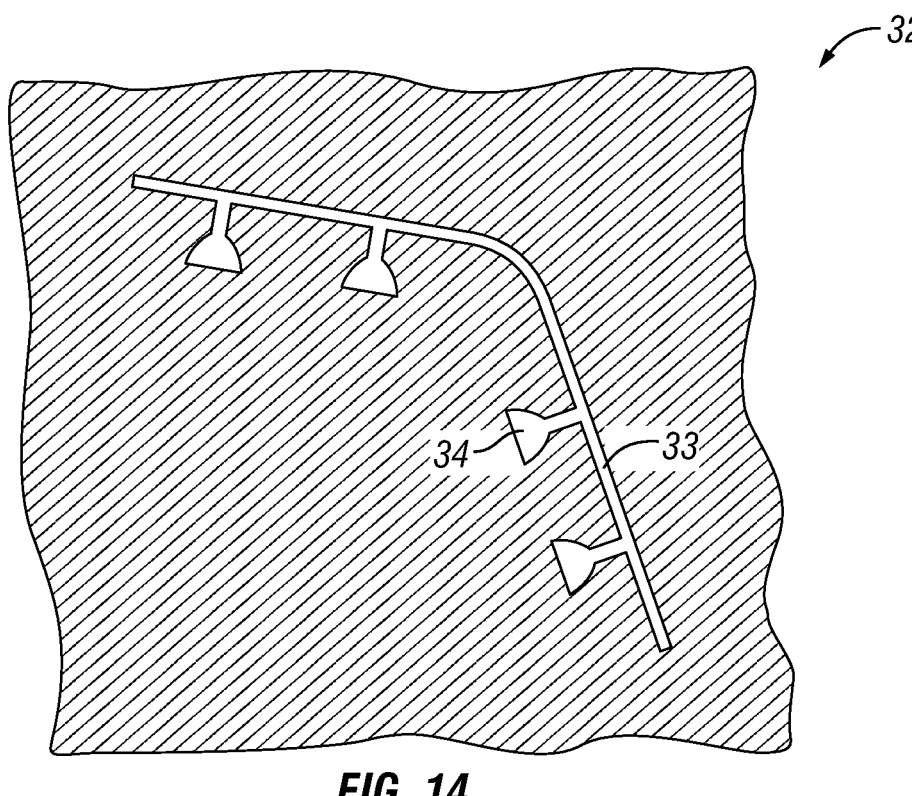
FIG. 14 is a top cross-sectional view of a mold segment base configured for receiving the sipe element of FIG. 13.

Another exemplary embodiment of the sipe element 14 and mold segment base 32 are shown in FIGS. 13 and 14 respectively. In FIG. 13, the sipe element 14 is bent along the length direction 42 and thus has a first side face 20 that has both curved and planar portions. The projections 30 are again all located along the first side face 20 and none are on the second side face 22. The projections 30 have a narrow portion that engages and extends from the first side face 20 in the width direction 24. At the end of the narrow portion a semicircle shaped section is located which represents the end of the projection 30 and is the portion of the projection 30 farthest from the first side face 20 in the width direction 24. The mold segment base 32 has cavities 34 that are shaped so as to be complimentary to the shape of the projections 30 and are oriented within the mold segment baes 32 to match the positioning of the projections 30 when the projections 30 are inserted therein. The shape narrow portion and semicircular portion function to lock the projections 30 into the cavities 34 are material will be present between the semicircular portion and the first side face 20, in addition to being present both above and below in the height direction 44. To insert the projections 30 into the cavities 34 sufficient force is applied to push the semicircular portions through the narrow portions of the cavities 34. The recess 33 is present to aid in user positioning of the sipe element 14, and the recess 33 is in communication with all of the cavities 34.

Figure 15:
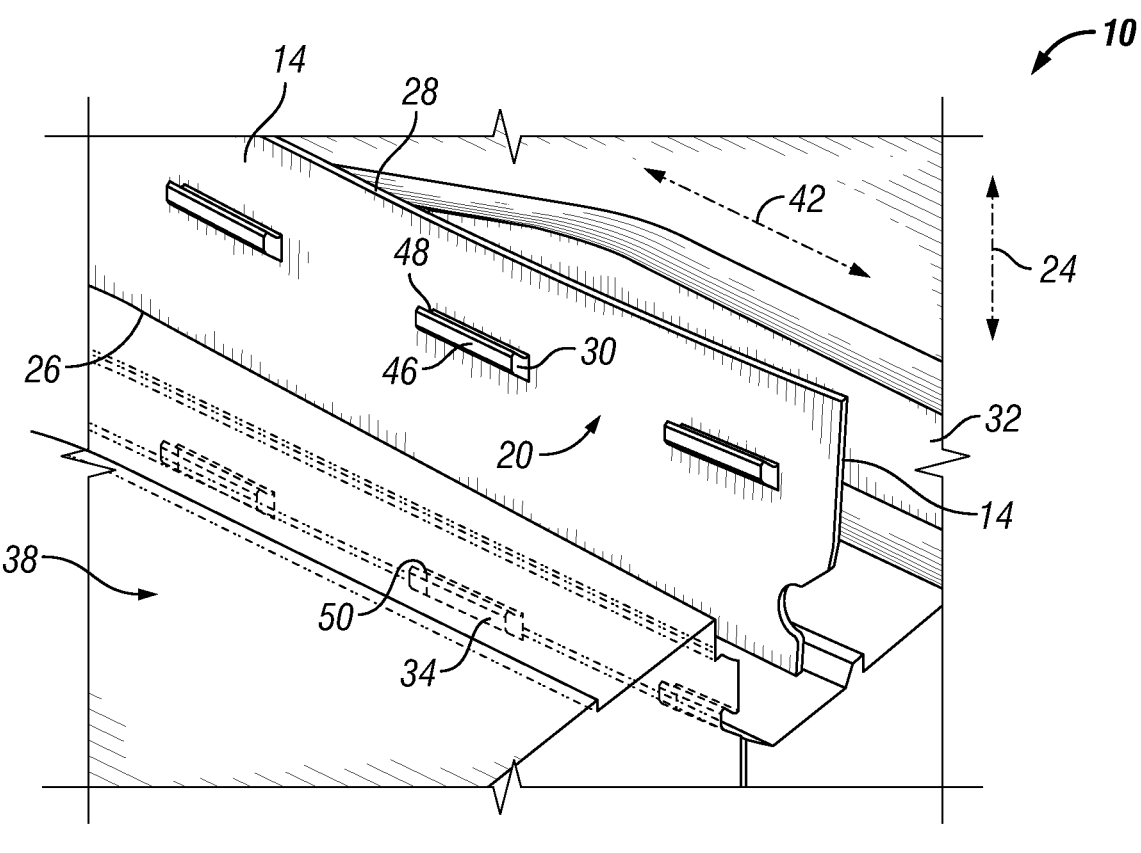
FIG. 15 is a perspective view of a mold segment base and a sipe element having projections with lips.
Figure 16:
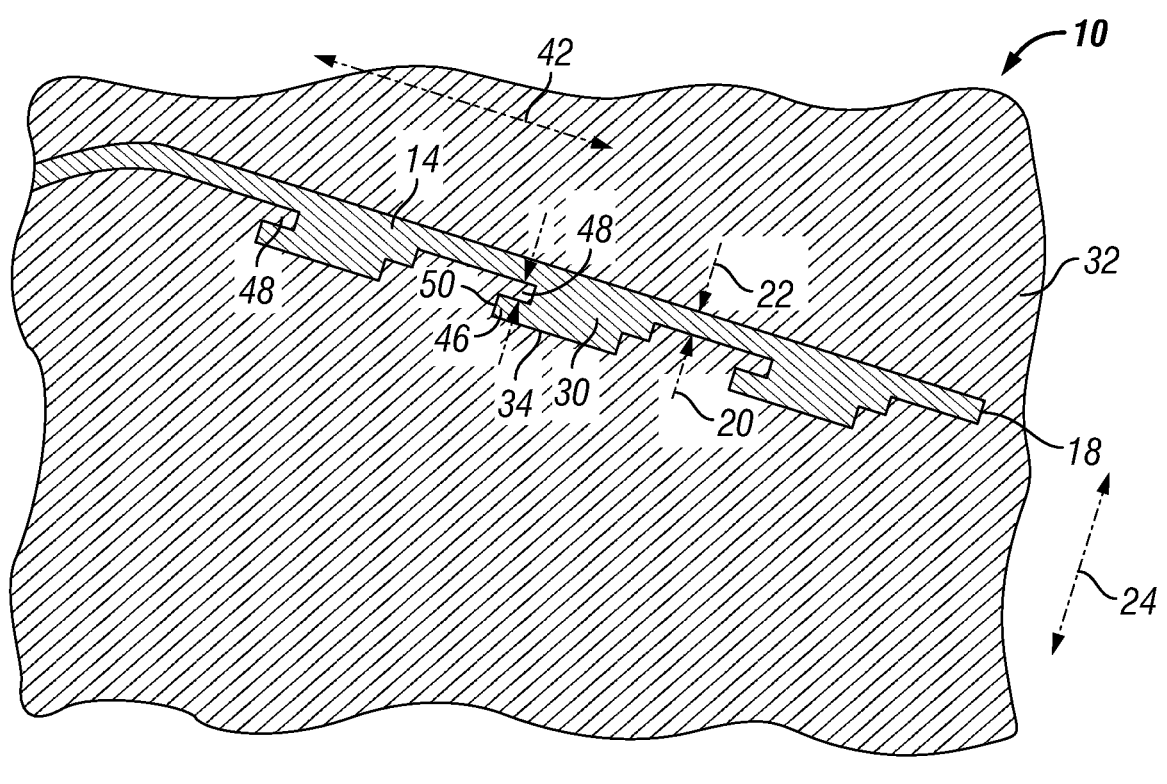
FIG. 16 is a top cross-sectional view of the sipe element inserted into the mold segment base of FIG. 15

FIGS. 15 and 16 illustrate another exemplary embodiment of the flexible mold segment 10 in which the projections 30 include an additional locking feature to render them even further attached to the flexible mold segment base 32. FIG. 15 shows the sipe element 14 detached from the mold segment base 32 but about to be inserted into the mold segment base 32, while FIG. 16 is a top, cross-sectional view of the mold segment 10 with the sipe element 14 in fact inserted into the mold segment base 32 so that the projections 30 are disposed within the cavities 34. The projection 30 extends from the first side face 20 in the width direction 24 and is shaped so as to define a lip 46 on one end in the longitudinal direction. An empty space 48 is in turn defined from the lip 46 to the first side face 20 in the width direction 24. In a complimentary configuration, the cavity 34 has a lip receiving portion 50 that is shaped and sized to receive the lip 46. The lip receiving portion 50 in turn is formed by a notch shaped protrusion of the material making up the mold segment base 32. The cavity 34 is also shaped and sized to receive the remaining portions of the projection 30, and when the projection 30 is inserted into the cavity 34 the lip 46 is disposed within the lip receiving portion 50. The material making up the mold segment base 32 may flex in order to allow the lip 46 to be inserted, and in some instances the sipe element 14 can slide in the length direction 42 so the lips 46 can be inserted into the lip receiving portions 50 without the need to deform or significantly deform the material making up the mold segment base 32. When inserted, the lip 46 has material of the mold segment base 32 between it and the first side face 20 which functions to further lock the projection 30 within the cavity 34 and in turn further hold the sipe element 14 in position within the mold segment base 32.

Figure 17:
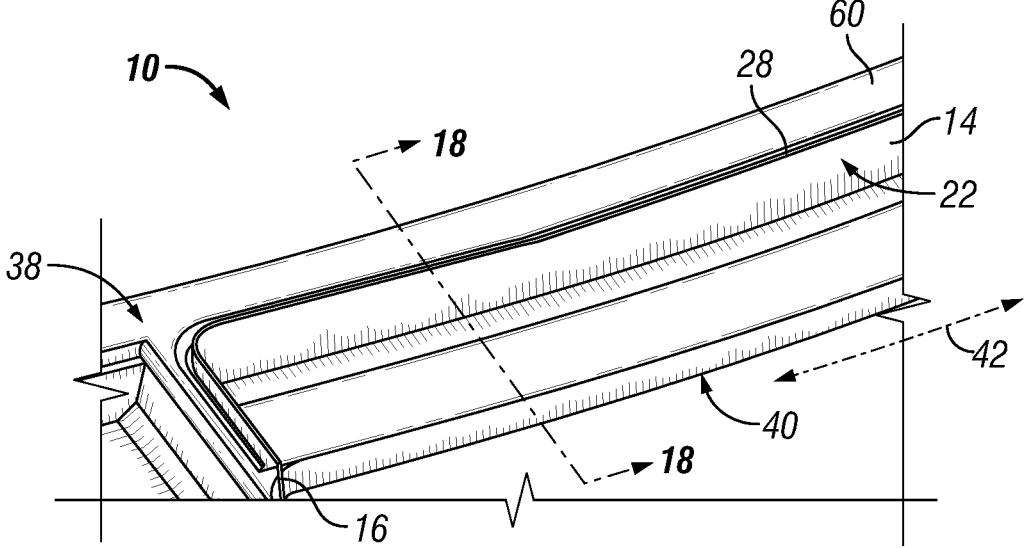
FIG. 17 is a perspective view of a flexible mold segment with a sipe element disposed next to a bead of the mold segment base.
Figure 18:
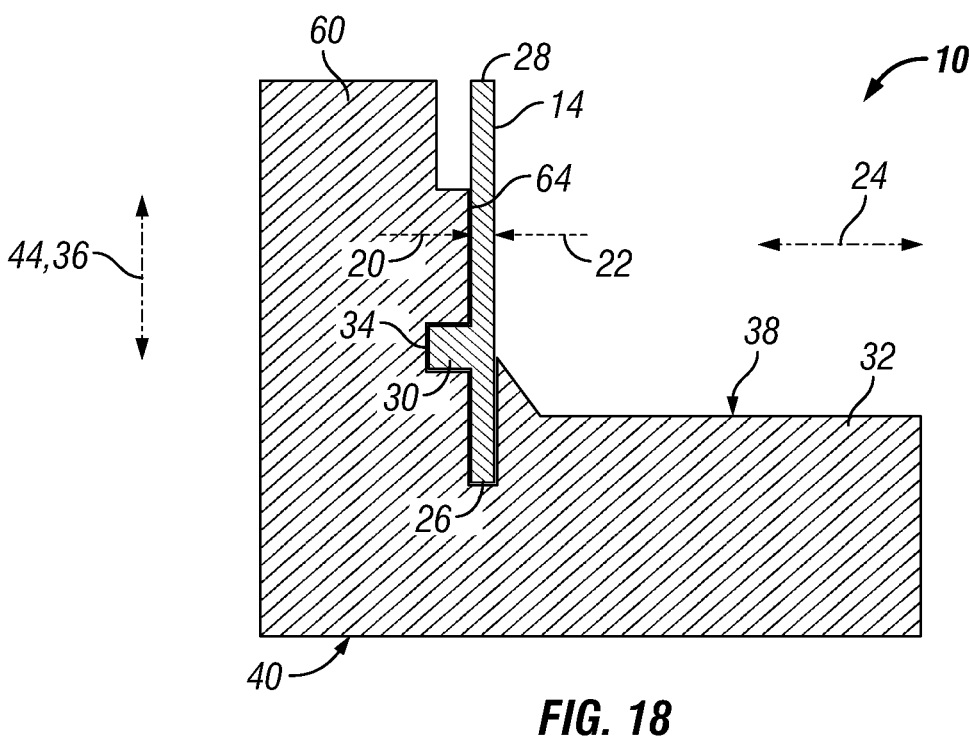
FIG. 18 is a cross-sectional view taken along line 18-18 of FIG. 17.

FIGS. 17 and 18 show another exemplary embodiment of the flexible mold segment 10 in which the sipe element 14 is disposed proximate to a bead 60 of the mold segment base 32. The bead 60 is provided in order to form a groove 90 of the tread 84, and this groove 90 may be a circumferential groove that extend completely 360 degrees about the tire 12 in the circumferential direction 80, or a groove that is not a circumferential groove and/or a groove that does not completely extend 369 degrees about the tire 12. The sipe element 14 is placed into the mold segment base 32 in a position to be parallel to the bead 60. In this regard, the bead 60 has a bead side wall 64 that extends in the length direction 42 over at least a portion of its length. The sipe element 14 engages the bead side wall 64, and in some embodiments the cavity 34 may extend into the side wall 64 and the projection 30 could in turn go into the side wall 64 via this cavity 34. In other arrangements, the cavity 34 is located lower than the side wall 64 in the mold segment base height direction 36 and the projection 30 is likewise lower than the side wall in this direction 36. The front side face 20 engages the side wall 64 and is also free from contact with the side wall 64 along some of its length and height. The sipe element 14 could be bent in the width direction 24 at its top area to effect this separation, or the material making up the mold segment base 32 and the side wall 64 may extend away from the sipe element 14 at this location to cause space to be present. The sipe element 14 may be spaced from the bead 60 at its top a distance of 0.5 millimeters, 1.0 millimeters, 1.5 millimeters, or from 0.01 to 2 millimeters in accordance with different exemplary embodiments to form a sipe 82 that is parallel and adjacent to the groove 90.

Figure 19:
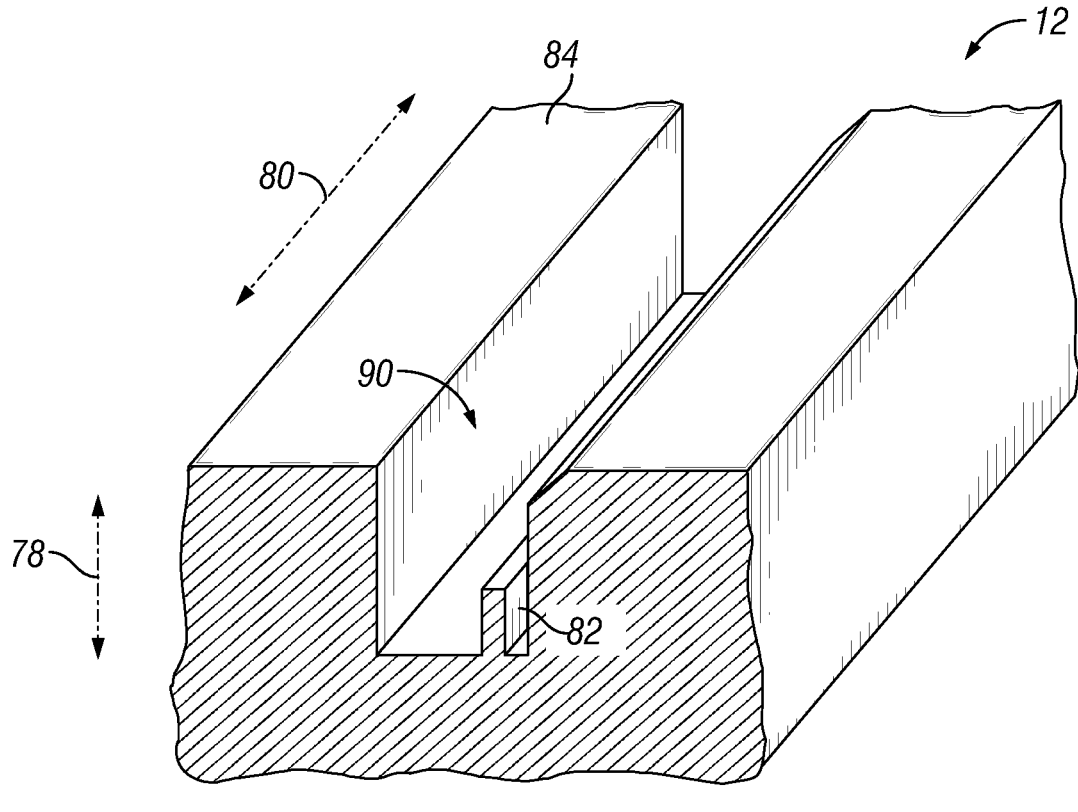
FIG. 19 is a perspective view of a portion of a tire eventually formed from the flexible mold segment of FIGS. 17 and 18.

The flexible mold segment 10 arrangement set up in FIGS. 17 and 18 is used to result in a production mold 92 capable of forming the tread 84 shown in FIG. 19. It is to be understood that FIG. 19 only shows a portion of the tread 84, and includes a circumferential groove 90 formed by the bead 60 of FIGS. 17 and 18. The circumferential sipe 82 is located adjacent the circumferential groove 90 and is formed by the sipe element 14. The inclusion of the projection 30 and cavity 34 arrangement allows for the sipe element 14 to be stabilized within the mold segment base 32 so that the circumferential sipe 82 can in fact be located precisely adjacent the circumferential groove 90 and parallel thereto. The sipe 82 has a width that can be two millimeters or less. The circumferential sipe 82 can be parallel to the circumferential groove 90 along the entire circumferential length of the circumferential groove 90 or may be parallel only along a portion of the circumferential length of the circumferential groove 90.

Figure 20:
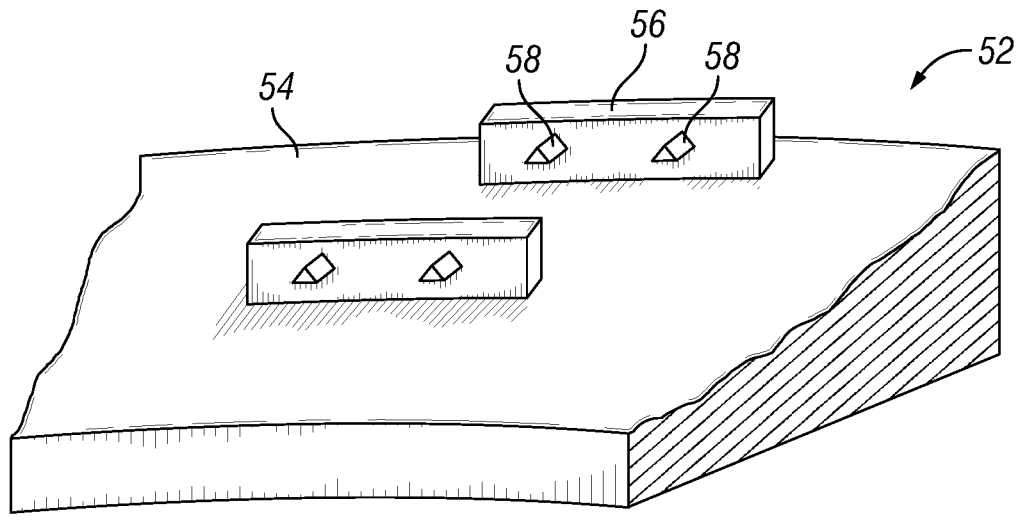
FIG. 20 is a perspective view of a master mold base with preliminary sipes having preliminary sipe projections for forming the cavities in the flexible mold segment.

A portion of a master mold 52 in accordance with one exemplary embodiment is shown in FIG. 20. The master mold 52 again includes preliminary sipes 56 put into a master mold base 54 as previously discussed. However, the preliminary sipes 56 have preliminary sipe projections 58 that extend from their face. The preliminary sipe projections 58 are used to form the cavities 34 of the mold segment base 32. In this regard, the material making up the flexible mold segment 10, such as polysulfide castable mold rubber or silastene, is poured over the preliminary sipes 56 and the master mold base 54. The presence of the preliminary sipe projections 58 create the cavities 34 in the mold segment base 32 when the hardened mold segment base 32 is peeled off of the master mold 52. It is to be understood that this method is but one way of making the cavities 34, and others are possible in accordance with other exemplary embodiments. The recesses 33 need not be present in other arrangements as well. The sipe element 14 is made of a harder material than the material making up the mold segment base 32. The master mold 52 can be formed via a number of different methods, and in some instances the preliminary sipes 56 are separate pieces that are inserted into the master mold base 54. In other instances, the preliminary sipes 56 and the master mold base 54 are formed by stereolithography such that the master mold base 54, preliminary sipe 56 with the preliminary sipe projections 58 are all formed as a single part without being assembled together.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

What is claimed is:

1. A mold segment for forming a tire, comprising:
   a sipe element that has a first end and a second end, wherein the sipe element has a first side face and an oppositely disposed second side face in a width direction of the sipe element, wherein the sipe element has a bottom and an oppositely disposed top in a height direction of the sipe element, wherein the sipe element has a plurality of projections that extend from the first side face such that the second side face does not have any of the projections located thereon; and
   a mold segment base made of a material that is more flexible than material making up the sipe element, wherein the mold segment base receives the sipe element such that the bottom of the sipe element is located inside of the mold segment base and the top of the sipe element is located outside of the mold segment base, wherein the mold segment base defines a plurality of cavities and wherein the projections are located inside of the cavities, wherein the cavities are larger in size than the projections such that the projections can move inside of the cavities when located within the cavities, wherein the mold segment base is used for producing a plaster cast segment for forming the tire, and wherein the mold segment base is not a production mold segment base;
   wherein the mold segment base has an upper surface, wherein a bead is present on the upper surface that forms a groove of the tire, wherein the bead has a side wall, wherein the plurality of cavities extend into the side wall of the bead and are located within the bead such that the projections are located inside of the bead, wherein the mold segment base has a recess that extends in a mold segment base height direction into the upper surface, wherein the plurality of cavities are located above the upper surface in the mold segment base height direction such that the upper surface is located between the recess and the plurality of cavities in the mold segment base height direction, and wherein the bottom of the sipe element is located within the recess.

2. The mold segment as set forth in claim 1, wherein the mold segment base is made of polysulfide castable mold rubber, and wherein the sipe element is forced into the polysulfide castable mold rubber to be received therein.

3. The mold segment as set forth in claim 1, wherein the sipe element has a length direction that extends from the first end to the second end, wherein the projections are spaced from both the first end and the second end in the length direction such that the projections are not located at the first end or the second end, wherein the projections are spaced from both the top and the bottom in the height direction such that the projections are not located at the top or the bottom.

4. The mold segment as set forth in claim 3, wherein the projections are longer in the length direction than in the height direction.

5. The mold segment as set forth in claim 3, wherein the projections are longer in the height direction than in the length direction.

6. The mold segment as set forth in claim 1, wherein the cavities have a shape that are the same shape as the projections.

7. The mold segment as set forth in claim 1, wherein the projections have lips that define spaces between the first side face and the lips in the width direction, wherein the cavities have lip receiving portions that receive the lips such that the lips engage the material making up the mold segment base on opposite sides of the lips in the width direction.

8. The mold segment as set forth in claim 1, further comprising a master mold with a master mold base and a preliminary sipe that has a preliminary sipe projection, wherein the mold segment base is poured on the master mold and formed therefrom such that the preliminary sipe projection forms one of the cavities of the mold segment base.

9. The mold segment as set forth in claim 8, wherein the master mold base and the preliminary sipe with the preliminary sipe projection are all formed by stereolithography such that the master mold base and the preliminary sipe with the preliminary sipe projection are all formed as a single part without being assembled together.

10. The mold segment as set forth in claim 1, wherein the sipe element with the projections are formed by additive manufacturing.

11. The mold segment as set forth in claim 1, wherein the sipe element engages the side wall of the bead.

12. The mold segment as set forth in claim 11, wherein the first side face engages the side wall of the bead along a length direction of the sipe element.

13. A mold segment for forming a tire, comprising:
   a sipe element that has a first end and a second end, wherein the sipe element has a first side face and an oppositely disposed second side face in a width direction of the sipe element, wherein the sipe element has a bottom and an oppositely disposed top in a height direction of the sipe element, wherein the sipe element has a plurality of projections that extend from the first side face such that the second side face does not have any of the projections located thereon; and
   a mold segment base made of a material that is more flexible than material making up the sipe element, wherein the mold segment base receives the sipe element such that the bottom of the sipe element is located inside of the mold segment base and the top of the sipe element is located outside of the mold segment base, wherein the mold segment base defines a plurality of cavities and wherein the projections are located inside of the cavities, wherein the mold segment base is used for producing a plaster cast segment for forming the tire, and wherein the mold segment base is not a production mold segment base;
   wherein the projections have lips that define spaces between the first side face and the lips in the width direction, wherein the cavities have lip receiving portions that receive the lips such that the lips engage the material making up the mold segment base on opposite sides of the lips in the width direction, wherein the mold segment base is located between the lip and the first side face;

wherein the mold segment base has an upper surface, wherein a bead is present on the upper surface that forms a groove of the tire, wherein the bead has a side wall, wherein the plurality of cavities extend into the side wall of the bead and are located within the bead such that the projections are located inside of the bead, wherein the mold segment base has a recess that extends in a mold segment base height direction into the upper surface, wherein the plurality of cavities are located above the upper surface in the mold segment base height direction such that the upper surface is located between the recess and the plurality of cavities in the mold segment base height direction, and wherein the bottom of the sipe element is located within the recess.

* * * * *